(12) United States Patent
Seibert et al.

(10) Patent No.: US 10,685,466 B2
(45) Date of Patent: Jun. 16, 2020

(54) SYSTEM AND METHOD OF UTILIZING VIDEO SYSTEMS WITH AVAILABLE BANDWIDTH

(71) Applicant: Dell Products L.P., Round Rock, TX (US)

(72) Inventors: Philip Seibert, Austin, TX (US); Richard W. Schuckle, Austin, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 219 days.

(21) Appl. No.: 15/602,538

(22) Filed: May 23, 2017

(65) Prior Publication Data

US 2018/0342091 A1    Nov. 29, 2018

(51) Int. Cl.
*H04N 7/15*     (2006.01)
*G06T 11/60*    (2006.01)

(52) U.S. Cl.
CPC ............ *G06T 11/60* (2013.01); *H04N 7/157* (2013.01)

(58) Field of Classification Search
CPC ............ H04N 21/2662; H04N 21/439; H04N 21/4621; H04N 7/157
See application file for complete search history.

(56) References Cited

U.S. PATENT DOCUMENTS

| | | | |
|---|---|---|---|
| 5,347,306 A * | 9/1994 | Nitta | H04N 7/00 345/473 |
| 5,546,324 A * | 8/1996 | Palmer | H04N 7/147 348/14.1 |
| 5,710,590 A * | 1/1998 | Ichige | G06T 9/001 348/14.01 |
| 6,219,045 B1* | 4/2001 | Leahy | H04W 4/029 715/757 |
| 8,385,596 B2* | 2/2013 | Latta | G06F 3/017 345/419 |
| 9,549,152 B1* | 1/2017 | Nayyar | H04N 7/148 |
| 2001/0007452 A1* | 7/2001 | Naka | G06T 13/40 345/473 |
| 2007/0280290 A1* | 12/2007 | Hindus | H04L 29/06 370/468 |
| 2008/0309675 A1* | 12/2008 | Fleury | G06T 17/00 345/581 |

(Continued)

OTHER PUBLICATIONS

Gregorij Kurillo et al., "Real-Time 3D Avatars for Tele-rehabilitation in Virtual Reality," University of California, 7 pages, 2011.

*Primary Examiner* — Justin S Lee
(74) *Attorney, Agent, or Firm* — Baker Botts L.L.P.

(57) ABSTRACT

In one or more embodiments, one or more systems, methods, and/or processes may receive, via at least one camera, a video stream that includes images of a person and audio and may determine a data rate between a system and another system. The one or more systems, methods, and/or processes may determine that the data rate is within a data rate range of multiple data rate ranges. If the data rate range is a first data rate range, a static picture of a face of the person may be composited onto an avatar skeleton and may be provided to a network. If the data rate range is a second data rate range, the face of the person may be composited onto an avatar of the person and may be provided to the network.

16 Claims, 9 Drawing Sheets

(56) References Cited

U.S. PATENT DOCUMENTS

| | | | | |
|---|---|---|---|---|
| 2010/0281432 A1* | 11/2010 | Geisner | ............... | G06F 3/011 |
| | | | | 715/849 |
| 2011/0210982 A1* | 9/2011 | Sylvan | ............... | G06F 9/5038 |
| | | | | 345/629 |
| 2012/0128201 A1* | 5/2012 | Brickhill | ............ | G06K 9/00355 |
| | | | | 382/103 |
| 2012/0257797 A1* | 10/2012 | Leyvand | ............ | G06K 9/00221 |
| | | | | 382/118 |
| 2013/0127994 A1* | 5/2013 | Mihelich | ............... | H04N 19/20 |
| | | | | 348/46 |
| 2013/0179377 A1* | 7/2013 | Oberg | ............... | G06K 9/00986 |
| | | | | 706/45 |
| 2013/0252216 A1* | 9/2013 | Clavin | ............... | G09B 19/0038 |
| | | | | 434/257 |
| 2013/0304587 A1* | 11/2013 | Ralston | ............ | G06Q 30/0271 |
| | | | | 705/14.67 |
| 2014/0009384 A1* | 1/2014 | Valik | ............... | G06F 3/0304 |
| | | | | 345/156 |
| 2014/0267544 A1* | 9/2014 | Li | ............... | H04M 1/72544 |
| | | | | 348/14.02 |
| 2015/0213604 A1* | 7/2015 | Li | ............... | G06T 13/40 |
| | | | | 345/473 |
| 2015/0215249 A1* | 7/2015 | Bruns-Bielkowicz | ............... | |
| | | | | H04L 51/10 |
| | | | | 709/206 |
| 2017/0318262 A1* | 11/2017 | Safaei | ............... | H04N 7/157 |
| 2017/0339372 A1* | 11/2017 | Valli | ............... | H04N 7/157 |
| 2018/0089880 A1* | 3/2018 | Garrido | ............... | H04N 21/4532 |
| 2018/0109468 A1* | 4/2018 | Sridhar | ............... | H04L 5/006 |
| 2018/0225517 A1* | 8/2018 | Holzer | ............... | G06K 9/00718 |

* cited by examiner

SYSTEM AND METHOD OF UTILIZING VIDEO SYSTEMS WITH AVAILABLE BANDWIDTH

BACKGROUND

Field of the Disclosure

This disclosure relates generally to video systems and more particularly to utilizing video systems with available bandwidth.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the past, geographically dispersed teams struggled with a lack of presence, engagement, and participation due to physical separation. For example, combining whiteboarding with face-to-face video can be challenging. For instance, a user may be too close to a camera for the camera to produce a non-distorted image or video. Moreover, when two rooms are spanned, a way that includes one or more parties in a room can also be challenging. For example, the two rooms may share a collaboration wall, and a single user of a remote office (e.g., a residential office) may need to be included in a collaboration.

SUMMARY

In one or more embodiments, one or more systems, methods, and/or processes may receive, via at least one camera, a first video stream that includes images of a person and audio and may determine a data rate between a system and another system. The one or more systems, methods, and/or processes may determine that the data rate is within a data rate range of multiple data rate ranges. If the data rate range is a first data rate range of the multiple data rate ranges, the one or more systems, methods, and/or processes may composite a static picture of a face of the person onto an avatar skeleton and may provide, to a network, a second video stream that includes a first composition of the static picture of the face of the person composited onto the avatar skeleton and the audio. If the data rate range is a second data rate range of the multiple data rate ranges, the one or more systems, methods, and/or processes may composite video of the face of the person onto an avatar of the person and may provide, to the network, the second video stream that includes a second composition of the video of the face of the person onto the avatar of the person and the audio. If the data rate range is below the first data rate range, the one or more systems, methods, and/or processes may provide, to the network, the second video stream that includes a static picture of the person and the audio. If the data rate range is above the second data rate range, the one or more systems, methods, and/or processes may provide, to the network, the first video stream and the audio. In one or more embodiments, one or more systems, methods, and/or processes may track the person and may modify at least one of an avatar skeleton and an avatar based on the data rate range and tracking the person.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
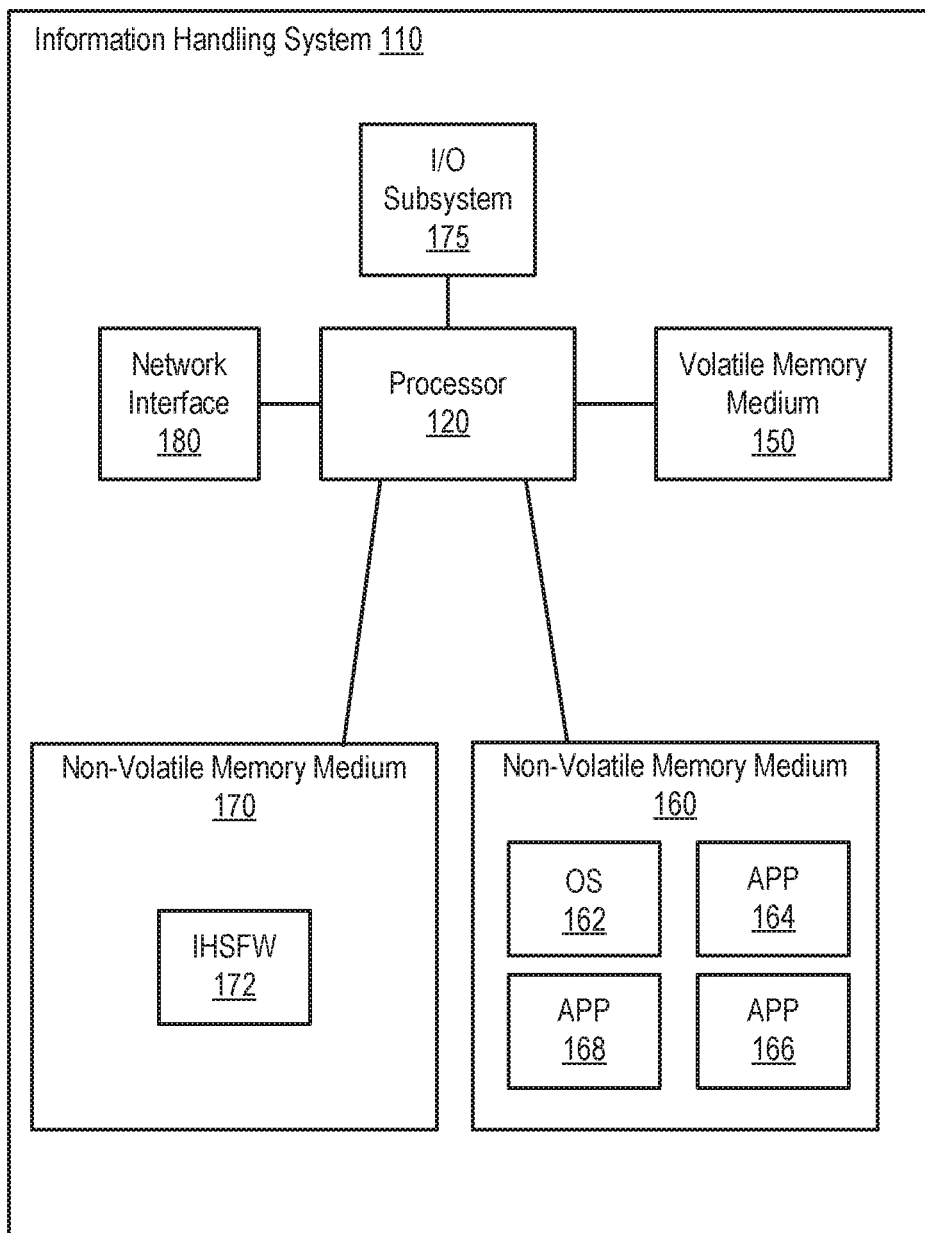
FIG. 1 illustrates an exemplary information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, a chamber (e.g., a huddle room, a video conference room, etc.) may be equipped with a video system that may include one or more of a video wall (e.g., a display, multiple displays, etc.), one or more cameras, and a motion/depth sensing device, among others. For example, a person may enter the chamber, and the video system may create an avatar of the person as the person moves about the chamber. In one instance, the motion/depth sensing device may be utilized in generating an avatar skeleton of the person.

In one or more embodiments, one or more of an avatar and an avatar skeleton of a person may be composited and/or overlaid onto an image of a chamber. For example, a composition of the one or more of the avatar and the avatar skeleton of the person and the image of the chamber may be provided to another video system via a network and a video protocol. In one or more embodiments, bandwidth (e.g., a maximum trafficable data rate) may be conserved by providing avatar data to the other video system. For example, the other video system may assemble the avatar and an environment, rather than receiving, from the video system, a video stream and displaying the video stream. For instance, when the person changes position, the video system may provide avatar skeletal data to the other video system, rather than a video stream.

In one or more embodiments, utilizing avatars may mitigate or may abate a camera perspective problem and/or issue. For example, rending of an avatar of a person may be consistent regardless of a location of a person relative to a location of a camera of a video system. In one or more embodiments, a person may be located at home. For example, the person may be inserted into a video stream of a chamber and/or a representation of the chamber. For instance, multiple video feeds from respective multiple video systems may be combined and provided to the person located at home. In one or more embodiments, the person located at home may participate in a digital whiteboard associated with the video systems. For example, the person located at home may utilize an input device and/or may utilize a motion/depth sensing device in utilizing a collaborative wall in a virtual reality. For instance, the person located at home may utilize a virtual reality headset.

In one or more embodiments, adapting data communicated between two video systems based on a bandwidth may include constructing content. In a low bandwidth example, data associated with an avatar skeleton may be communicated and/or updated. For instance, an image of a chamber may not need to be updated. In a high bandwidth example, video may be updated in real-time.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, term "memory medium" may mean a "storage device", a "memory", a "memory device", "tangible computer readable storage medium", and/or "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2:
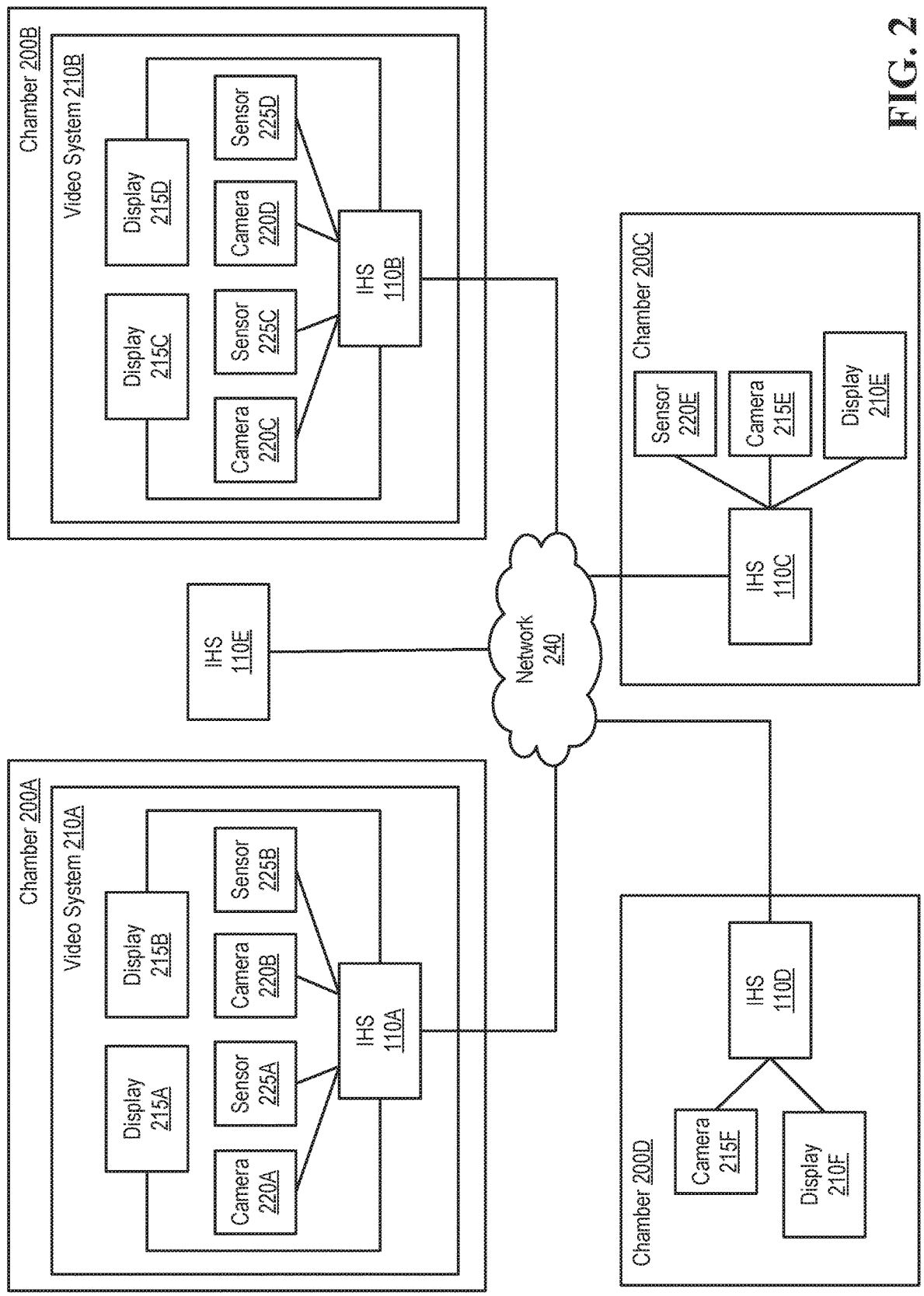
FIG. 2 provides exemplary video systems, according to one or more embodiments.

Turning now to FIG. 2, exemplary video systems are illustrated, according to one or more embodiments. As shown, video systems 210A and 210B may be located in chambers 200A and 200B, respectively. In one or more embodiments, chamber 200 may be or include a huddle room, a videoconference room, etc. As illustrated, video system 210A may include displays 215A and 215B, cameras 220A and 220B, sensors 225A and 225B, and an IHS 110A, and video system 210B may include displays 215C and 215D, cameras 220C and 220D, sensors 225C and 225D, and an IHS 110B. As shown, displays 215A and 215B, cameras 220A and 220B, sensors 225A and 225B may be coupled to IHS 110A, and displays 215C and 215D, cameras 220C and 220D, sensors 225C and 225D may be coupled to IHS 110B.

As illustrated, an IHS 110C, a display 210E, a camera 215E, and a sensor 220E may be located in a chamber 200C, and an IHS 110D, a display 210F, and a camera 215F may be located in a chamber 200C. In one or more embodiments, two or more of display 210E, camera 215E, sensor 220E, and IHS 110C may be combined, and/or two or more of display 210F, camera 215F, and IHS 110D may be combined. For example, display 210F, camera 215F, and IHS 110D may be combined in a laptop computing device, a smartphone, or a tablet computing device, among others.

As shown, information handling systems (IHSs) 110A-110E may be coupled to a network 240. In one or more embodiments, network 240 may include a wired network, a wireless network, an optical network, or a combination of the foregoing, among others. For example, network 240 may include and/or be coupled to various types of communications networks. For instance, network 240 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others. In one or more embodiments, two or more of IHSs 110A-110E may utilize network 240 to communicate data. For example, the data may include one or more of audio data, video data, image data, and avatar data, among others.

Figure 3A:
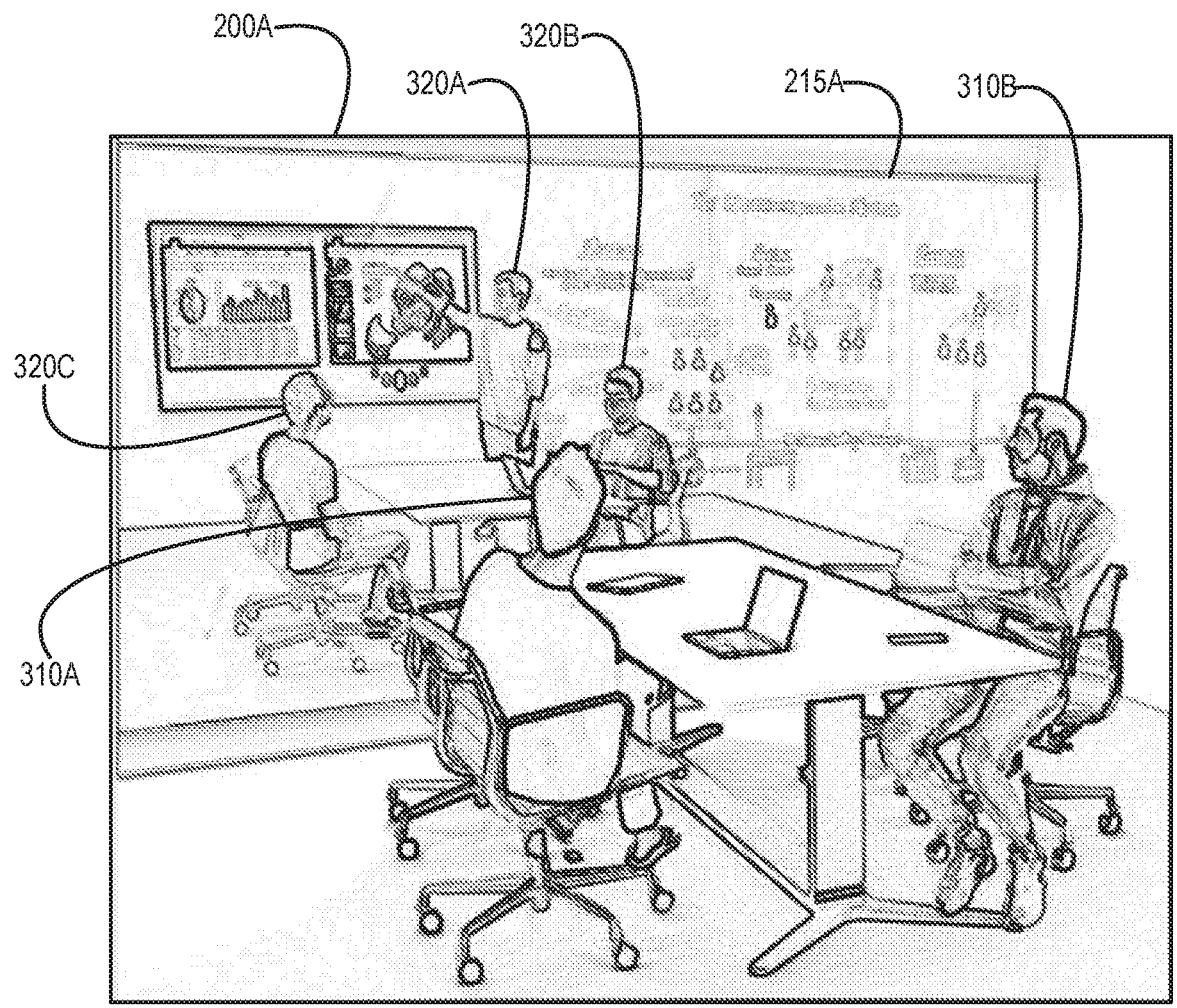
FIG. 3A illustrates an exemplary chamber that includes a video system, according to one or more embodiments.

Turning now to FIG. 3A, an exemplary chamber that includes a video system is illustrated, according to one or more embodiments. As shown, people 310A and 310B may be in chamber 200A. As illustrated, display 215A may display avatars 320A-320C. For example, avatars 320A-320C may represent people in chamber 200B. For instance, IHS 110B may create avatars 320A-320C from people in chamber 200B. In one or more embodiments, one or more of sensors 225C and 225D may be utilized in creating avatars 320A-320C from people in chamber 200B. In one example, sensor 225 may include one or more projectors. In another example, sensor 225 may include one or more depth sensors, image sensors, and/or cameras. For instance, one or more image sensors and/or cameras may receive light from objects that may be illuminated via the one or more projectors.

In one or more embodiments, bandwidth (e.g., a maximum trafficable data rate) between IHS 110A and IHS 110B may not support full video and/or audio. For example, network 240 may not support full video and/or audio between IHS 110A and IHS 110B. For instance, avatars 320A-320C may be utilized rather than video of people of chamber 200B.

Figure 3B:
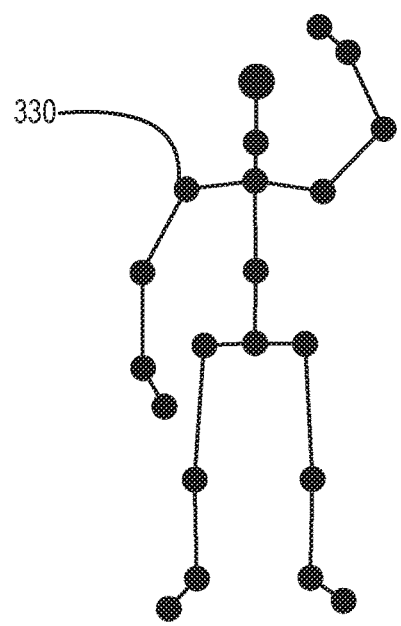
FIG. 3B illustrates an exemplary avatar skeleton, according to one or more embodiments.

In one or more embodiments, bandwidth between IHS 110A and IHS 110B may not support full avatar and/or audio. For example, network 240 may not support full avatar and/or audio between IHS 110A and IHS 110B. For instance, one or more avatar skeletons may be utilized rather than one or more full avatars. As illustrated in FIG. 3B, an avatar skeleton 330 may be utilized. For example, avatar skeleton 330 may represent a person. For instance, an avatar skeleton, such as avatar skeleton 330, may be utilize instead of a person or instead of a full avatar.

Figure 3C:
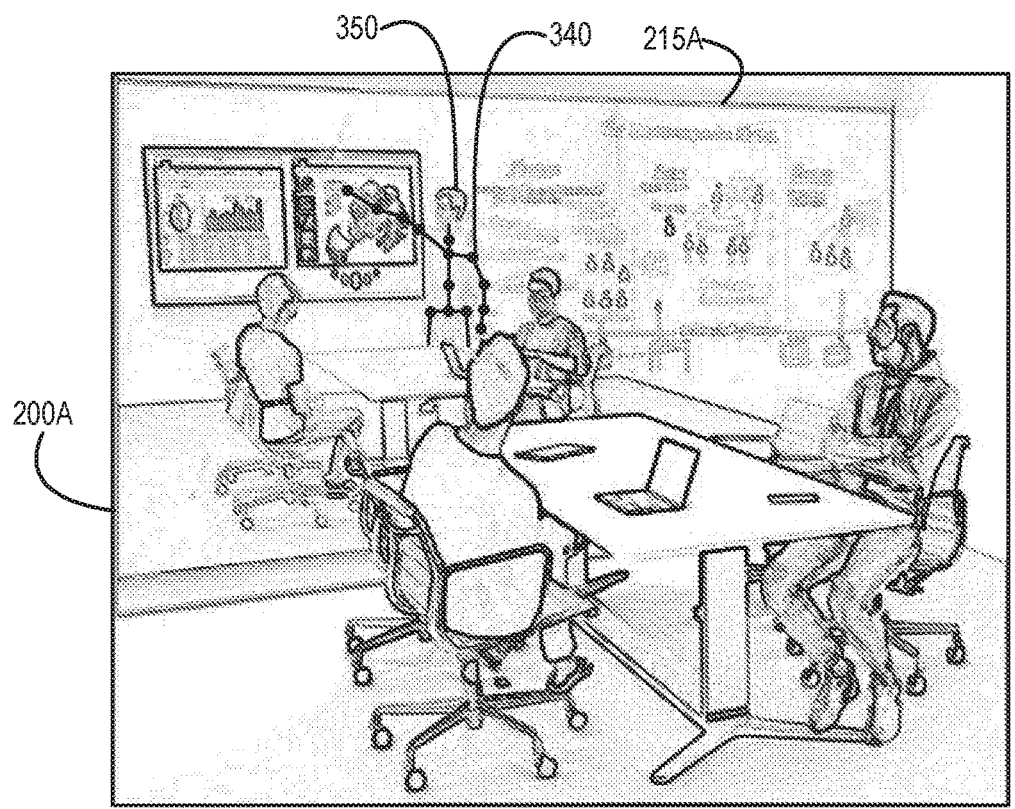
FIG. 3C illustrates an exemplary chamber that includes a video system that displays a partial avatar skeleton, according to one or more embodiments.

As shown in FIG. 3C, an avatar skeleton 340 may be utilized. For example, avatar skeleton 340 may represent a person. For instance, avatar skeleton 340, may be utilize instead of a person or instead of a full avatar. In one or more embodiments, bandwidth between IHS 110A and IHS 110B may support an avatar skeleton and a facial image or a facial video. For example, a face 350 may be utilized with avatar skeleton 340. In one instance, face 350 may be a static image. In another instance, face 350 may be a facial video. In one or more embodiments, other displayed information associated with chamber 200B may be or include a static image of one or more of chamber 200B and one or more of people in chamber 200B, among others.

In one or more embodiments, one or more of sensors 225C and 225D may be utilized in updating one or more of avatars 320A-320C. In one example, one or more of sensors 225C and 225D may track one or more people in chamber 200B. For instance, tracking the one or more people in chamber 200B may include determining one or movements of the one or more people in chamber 200B. In a second example, one or more of sensors 225C and 225D may be utilized in updating one or more avatars 320A-320C based on tracking the one or more people in chamber 200B. In another example, one or more of sensors 225C and 225D may be utilized in updating one or more of avatar skeletons 340 and 350 based on tracking the one or more people in chamber 200B.

In one or more embodiments, one or more of an avatar and an avatar skeleton may be rendered into one or more standard video formats. For example, one or more of an avatar and an avatar skeleton may be rendered into one or more of H.264 (e.g., scalable video coding), H.320, H.323, H.324, and WebRTC (Web Real-Time Communication) protocols and/or formats, among others. In one or more embodiments, two or more IHSs may be able to interact utilizing avatar-based communications. For example, the two or more IHSs may transmit and/or receive data that includes avatar movements. For instance, the data that includes the avatar movements may be less data than a standard video format.

In one or more embodiments, a data description language may be utilized in conveying avatar movements. In one example, the data description language may utilize a markup language. For instance, the markup language may be or include an extensible markup language (XML). In another example, the data description language may be or include a JavaScript Object Notation (JSON). In one or more embodiments, a coordinate system may be utilized in conveying avatar movements. In one example, the coordinate system may include a Cartesian coordinate system. In a second example, the coordinate system may include a cylindrical coordinate system. In another example, the coordinate system may include a spherical coordinate system.

Figure 3D:
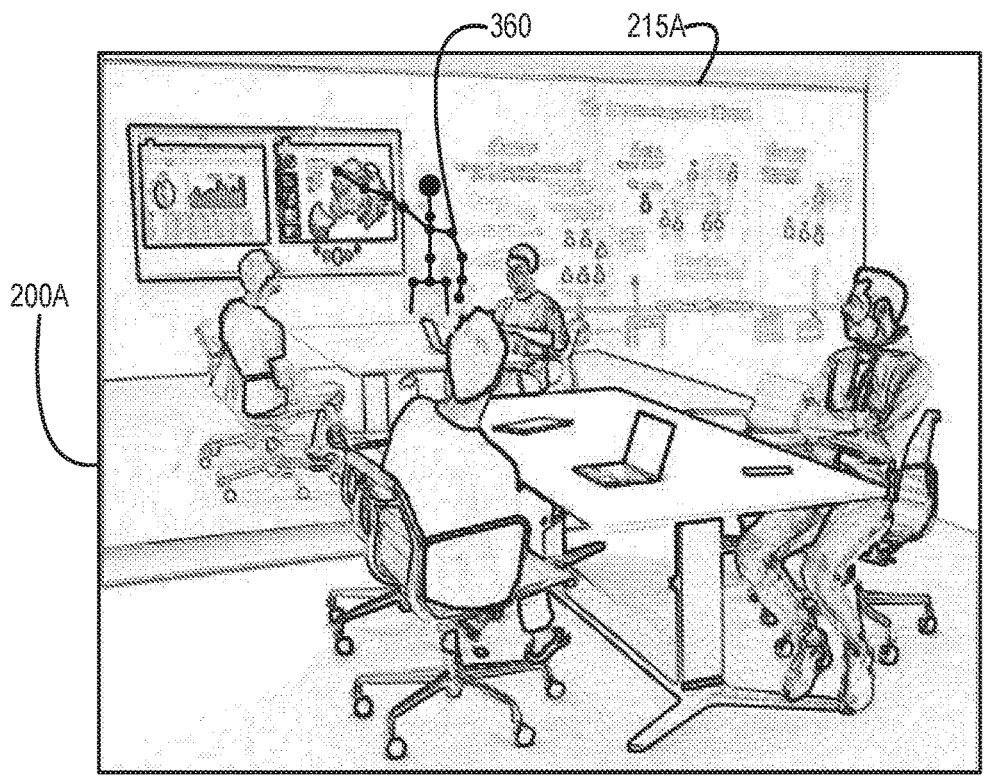
FIG. 3D illustrates an exemplary chamber that includes a video system that displays an avatar skeleton, according to one or more embodiments.
Figure 3E:
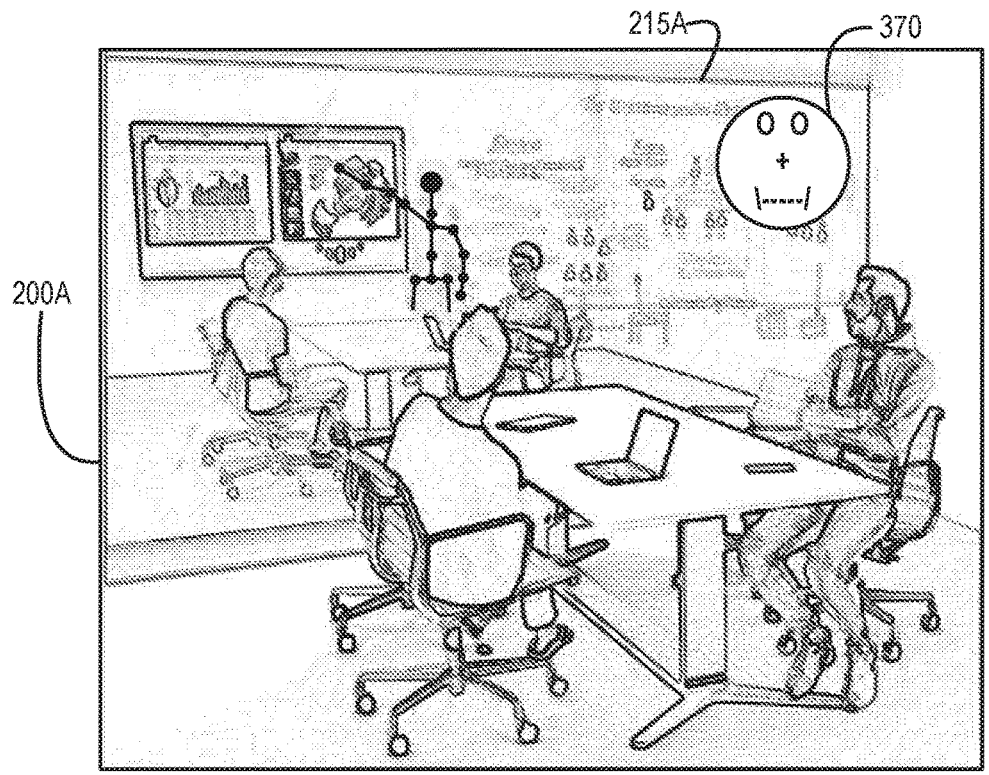
FIG. 3E illustrates a graphic that represents a participant, according to one or more embodiments.

In one or more embodiments, bandwidth between IHS 110A and IHS 110B may not support an avatar skeleton and a facial image or a facial video. For example, a full avatar skeleton may be utilized if bandwidth between IHS 110A and IHS 110B may not support an avatar skeleton and a facial image or a facial video. As illustrated in FIG. 3D, a full avatar skeleton 360 may be utilized. In one or more embodiments, bandwidth between IHS 110A and IHS 110C may not support an avatar skeleton. For example, an icon or a graphic may be utilized if bandwidth between IHS 110A and IHS 110C may not support an avatar skeleton. In one or more embodiments, a sensor that may be utilized in producing an avatar skeleton may not be available. For example, no sensor that may be utilized in producing an avatar skeleton is coupled to IHS 110D. As illustrated in FIG. 3E, a graphic 370 may be utilized if there is not enough bandwidth to support an avatar skeleton or if a sensor is not available to determine an avatar skeleton.

In one or more embodiments, IHS 110E may be or include a video conferencing system bridge. In one example, IHS 110E may be or include a multipoint video conferencing system. In another example, IHS 110E may permit two or more video systems and/or IHSs to exchange video data, avatar-based data (e.g., avatar construction data, avatar movement data, etc.), and/or audio data for a video and/or audio conference. In one instance, bandwidth between IHS 110A and IHS 110B may include and/or be dependent upon and/or based on one or more of bandwidth between IHS 110A and IHS 110E and/or between IHS 110B and IHS 110E. In another instance, bandwidth between IHS 110A and IHS 110C may include and/or be dependent upon and/or based on one or more of bandwidth between IHS 110A and IHS 110E and/or between IHS 110C and IHS 110E.

Figure 4:
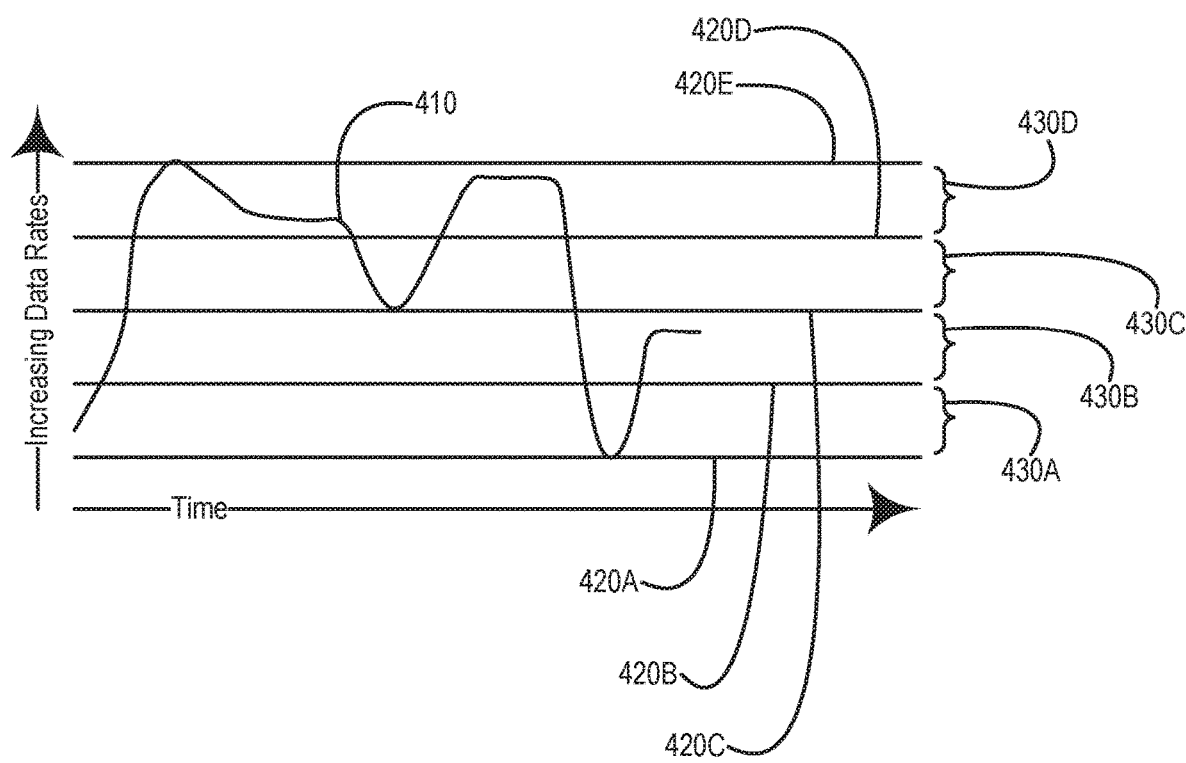
FIG. 4 illustrates an exemplary bandwidth curve, according to one or more embodiments.

Turning now to FIG. 4, an exemplary bandwidth curve is illustrated, according to one or more embodiments. As shown, a bandwidth curve 410 may include different bandwidths over one or more periods of time. As illustrated, bandwidth curve 410 may be at or above data rate thresholds 420A-420E. For example, threshold 420A may be zero. As shown, each of data rate ranges 430A-430D may be between two thresholds. In one or more embodiments, a data rate range can include none or one or more thresholds. In one example, a data rate range of data rate ranges 430A-430D may include a lower threshold. In a second example, a data rate range of data rate ranges 430A-430D may include an upper threshold. In a third example, a data rate range of data rate ranges 430A-430D may include a lower threshold and an upper threshold. In another example, a data rate range of data rate ranges 430A-430D may not include a lower threshold or an upper threshold.

In one or more embodiments, a data rate threshold and/or a data rate range may be utilized in determining one or more operations of a video system. In one example, if a data rate is at or above threshold 420D, full video and audio may be exchanged between two IHSs and/or two video systems. If a data rate is within data rate range 430A, audio may be exchanged between or among two or more IHSs. If a data rate is within data rate range 430B, audio and a static facial image may be exchanged between two or more IHSs. If a data rate is within data rate range 430C, audio, an avatar skeleton, and a static facial image may be exchanged between or among two or more IHSs. If a data rate is within data rate range 430D, audio, an avatar, and a facial video may be exchanged between or among two or more IHSs. If a data rate is within data rate range 430E, full audio and video may be exchanged between or among two or more IHSs.

Figure 5A:
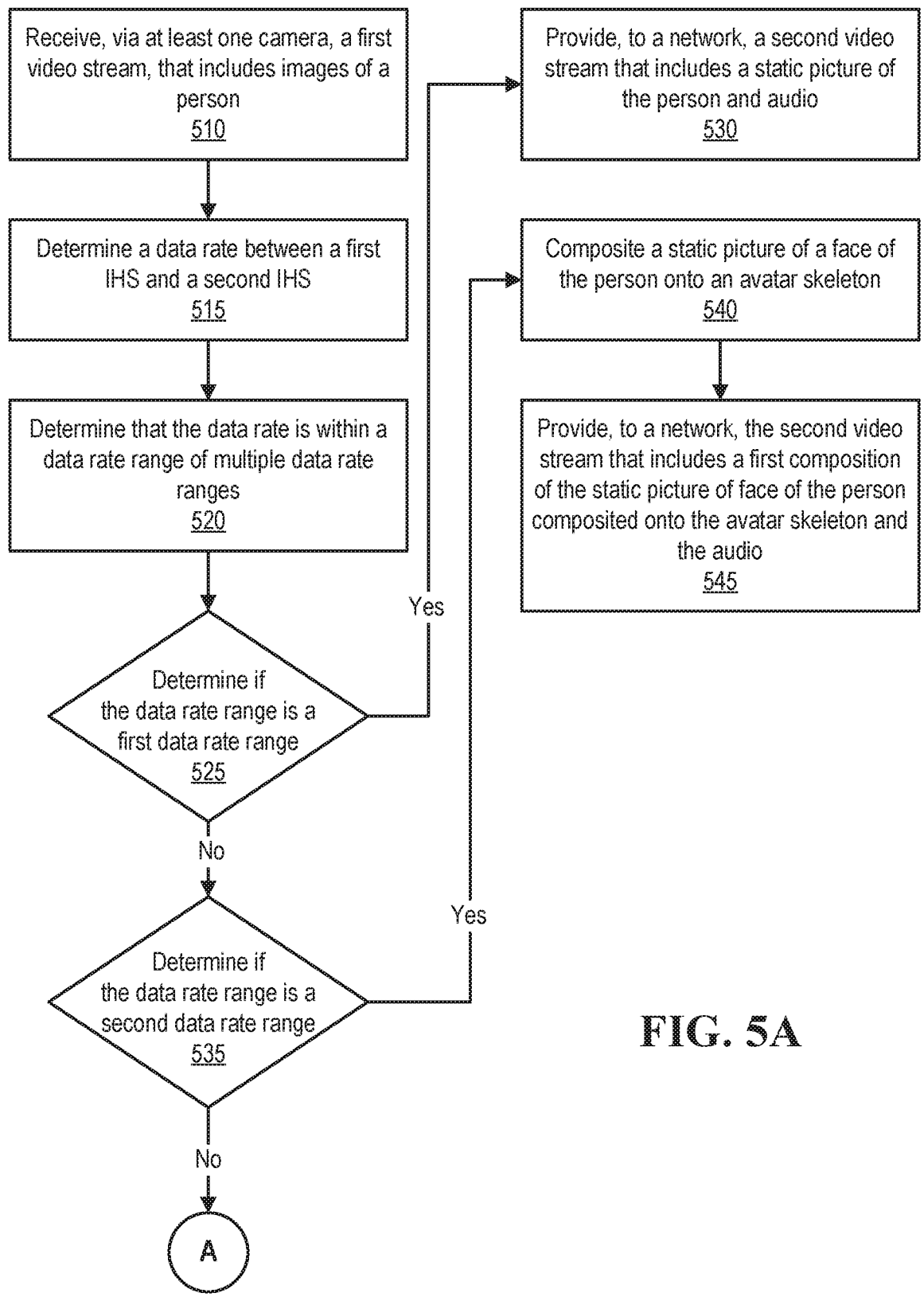
FIGS. 5A and 5B illustrate a method of operating a video system, according to one or more embodiments.
Figure 5B:
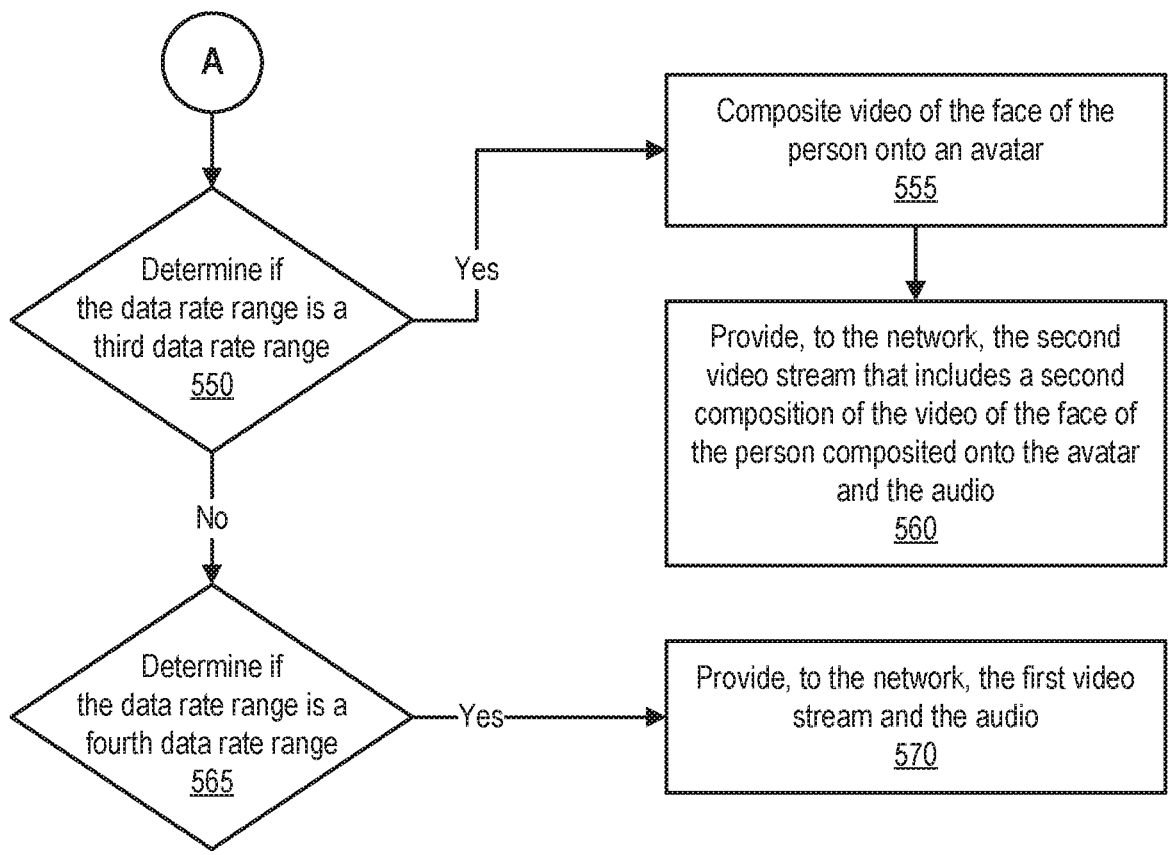

Turning now to FIGS. 5A and 5B, a method of operating a video system is illustrated, according to one or more embodiments. At 510, a first video stream may be received from at least one camera. For example, a first video stream may be received from at least one of cameras 220C and 220D.

At 515, a data rate may be determined between a first IHS and a second IHS. In one example, a data rate may be determined between IHS 110A and IHS 110B. In another example, a data rate may be determined between IHS 110B and IHS 110C. In one or more embodiments, determining the data rate between the first IHS and the second IHS may include utilizing adaptive bitrate streaming. For example, IHS 110B may provide data to IHS 110A, and IHS 110B may provide the data to IHS 110A at multiple bit rates. For instance, IHS 110A may determine which of the multiple bit rates is the fastest acceptable bit rate. In one or more embodiments, determining a data rate between the first IHS and the second IHS may include determining a latency. For example, the data rate between the first IHS and the second IHS may be based on the latency. In one or more embodiments, multiple data rates may be determined throughout a videoconference, and changes may be made to accommodate and/or better utilize an available different and/or newly determined data rate.

At 520, it may be determined that the data rate is within a data rate range of multiple data rate ranges. For example, it may be determined that the data rate is within a data rate range of data rate ranges 430A-430D. At 525, it may be determined if the data rate range is a first data rate range of the multiple data rate ranges. If the data rate range is the first data rate range of the multiple data rate ranges, a second video stream that includes a static picture of a person and audio may be provided to a network at 530. In one example, the first data rate range of the multiple data rate ranges may be data rate range 430A of data rate ranges 430A-430D. In another example, the network may be or include network 240. If the data rate range is not the first data rate range of the multiple data rate ranges, the method may proceed to 535.

At 535, it may be determined if the data rate range is a second data rate range of the multiple data rate ranges. If the data rate range is the second data rate range of the multiple data rate ranges, a static picture of a face of a person may be composited onto an avatar skeleton at 540. In one or more embodiments, compositing the static picture of the face of the person may onto the avatar skeleton may include compositing and/or overlaying the static picture of the face of the person may and the avatar skeleton onto a image of a chamber (e.g., chamber 200B).

At 545, the second video stream that includes a first composition of the static picture of the face of the person composited onto the avatar skeleton and the audio may be provided to the network. In one example, the second data rate range of the multiple data rate ranges may be data rate range 430B of data rate ranges 430A-430D. In another example, the network may be or include network 240. In one or more embodiments, providing, to the network, the second video stream that includes the first composition of the static picture of the face of the person composited onto the avatar skeleton and the audio may include providing, to the network, the second video stream that includes the first composition of the static picture of the face of the person composited onto the avatar skeleton composited onto the image of the chamber. If the data rate range is not the second data rate range of the multiple data rate ranges, the method may proceed to 550.

At 550, it may be determined if the data rate range is a third data rate range of the multiple data rate ranges. If the data rate range is the third data rate range of the multiple data rate ranges, video of the face of the person may be composited onto an avatar of the person at 555. At 560, the second video stream that includes a second composition of the video of the face of the person composited onto the avatar and the audio may be provided to the network. In one example, the third data rate range of the multiple data rate ranges may be data rate range 430C of data rate ranges 430A-430D. In another example, the network may be or include network 240. If the data rate range is not the third data rate range of the multiple data rate ranges, the method may proceed to 565.

At 565, it may be determined if the data rate range is a fourth data rate range of the multiple data rate ranges. If the data rate range is the fourth data rate range of the multiple data rate ranges, the first video stream and the audio may be provided to the network at 570. In one example, the fourth data rate range of the multiple data rate ranges may be data rate range 430D of data rate ranges 430A-430D. In another example, the network may be or include network 240. In one or more embodiments, the fourth data rate range may not include an upper threshold.

In one or more embodiments, it may be determined that the data rate changes to another data rate. For example, the method illustrated in FIGS. 5A and 5B may be repeated utilizing the other data rate. For instance, the second video stream may be altered in accordance with the other data rate and the method illustrated in FIGS. 5A and 5B.

Figure 6:
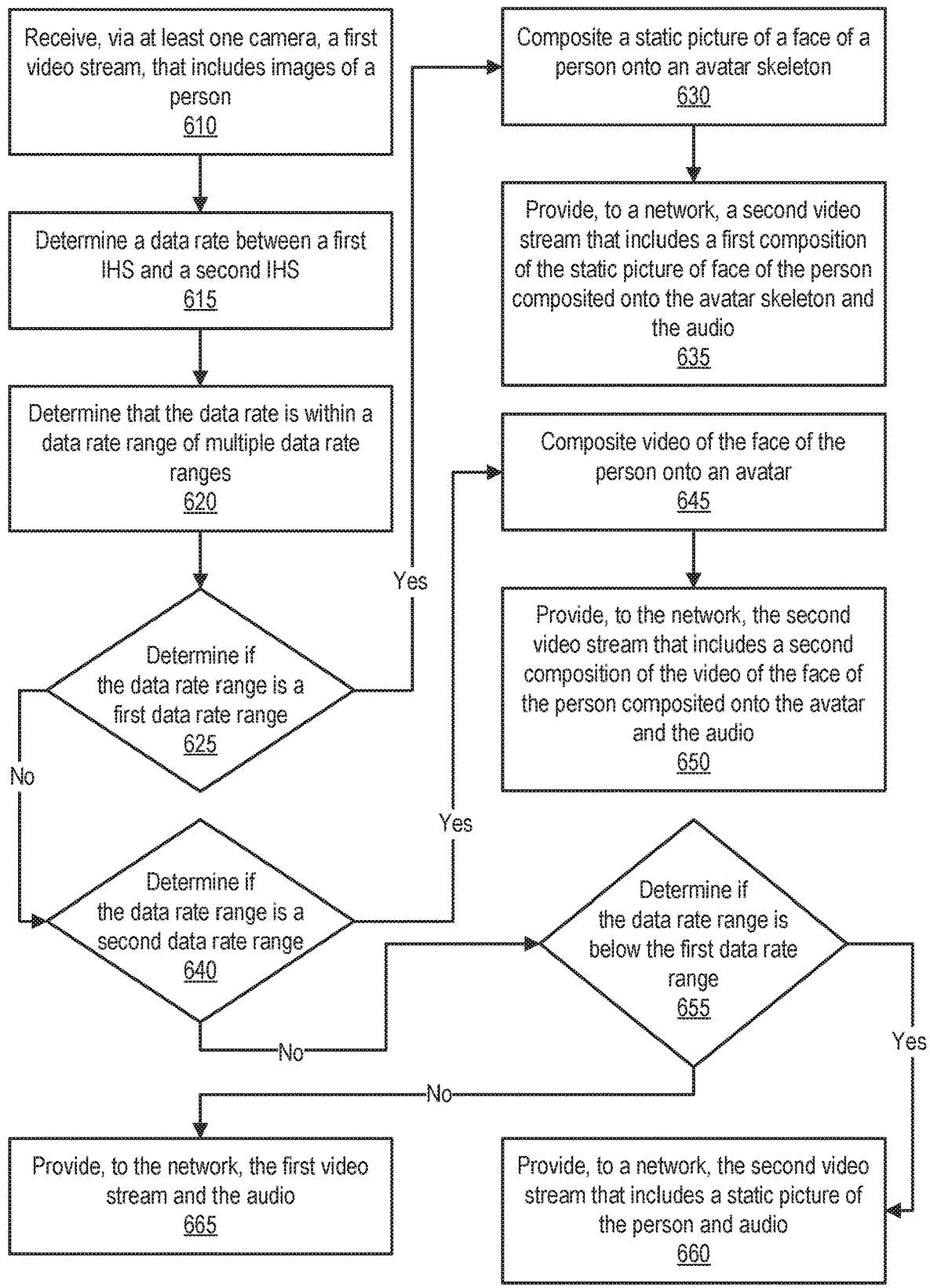
FIG. 6 illustrates another method of operating a video system, according to one or more embodiments.

Turning now to FIG. 6, another method of operating a video system is illustrated, according to one or more embodiments. At 610, a first video stream may be received from at least one camera. For example, a first video stream may be received from at least one of cameras 220C and 220D.

At 615, a data rate may be determined between a first IHS and a second IHS. In one example, a data rate may be determined between IHS 110A and IHS 110B. In another example, a data rate may be determined between IHS 110B and IHS 110C. In one or more embodiments, determining the data rate between the first IHS and the second IHS may include utilizing adaptive bitrate streaming. For example, IHS 110B may provide data to IHS 110A, and IHS 110B may provide the data to IHS 110A at multiple bit rates. For instance, IHS 110A may determine which of the multiple bit rates is the fastest acceptable bit rate. In one or more embodiments, determining a data rate between the first IHS and the second IHS may include determining a latency. For example, the data rate between the first IHS and the second IHS may be based on the latency. In one or more embodiments, multiple data rates may be determined throughout a videoconference, and changes may be made to accommodate and/or better utilize an available different and/or newly determined data rate.

At 620, it may be determined that the data rate is within a data rate range of multiple data rate ranges. For example, it may be determined that the data rate is within a data rate range of data rate ranges 430A-430D. At 625, it may be determined if the data rate range is a first data rate range of the multiple data rate ranges. If the data rate range is the first data rate range of the multiple data rate ranges, a static picture of a face of a person may be composited onto an avatar skeleton at 630. In one or more embodiments, compositing the static picture of the face of the person may onto the avatar skeleton may include compositing and/or overlaying the static picture of the face of the person may and the avatar skeleton onto a image of a chamber (e.g., chamber 200B).

At 635, a second video stream that includes a first composition of the static picture of the face of the person composited onto the avatar skeleton and the audio may be provided to a network. In one example, the first data rate range of the multiple data rate ranges may be data rate range 430B of data rate ranges 430A-430D. In another example, the network may be or include network 240. In one or more embodiments, providing, to the network, the second video stream that includes the first composition of the static picture of the face of the person composited onto the avatar skeleton and the audio may include providing, to the network, the second video stream that includes the first composition of the static picture of the face of the person composited onto the avatar skeleton composited onto the image of the chamber.

If the data rate range is not the first data rate range of the multiple data rate ranges, the method may proceed to 640. At 640, it may be determined if the data rate range is a second data rate range of the multiple data rate ranges. If the data rate range is the second data rate range of the multiple data rate ranges, video of the face of the person may be composited onto an avatar of the person at 645. At 650, the second video stream that includes a second composition of the video of the face of the person composited onto the avatar and the audio may be provided to the network. In one example, the second data rate range of the multiple data rate ranges may be data rate range 430C of data rate ranges 430A-430D. In another example, the network may be or include network 240.

If the data rate range is not the second data rate range of the multiple data rate ranges, it may be determined if the data rate range is below the first data rate range at 655. If the data rate range is below the first data rate range of the multiple data rate ranges, the second video stream that includes a static picture of the person and audio may be provided to the network at 660. In one example, the data rate range is below the first data rate range of the multiple data rate ranges may be data rate range 430A of data rate ranges 430A-430D. In another example, the network may be or include network 240.

If the data rate range is not below the first data rate range of the multiple data rate ranges, the first video stream and the audio may be provided to the network at 665. In one example, if the data rate range is not the first data rate range, not the second data rate range, and not below the second data rate range, the data rate range may be data rate range 430D of data rate ranges 430A-430D. In another example, the network may be or include network 240. In one or more embodiments, data rate range 430D may not include an upper threshold.

In one or more embodiments, it may be determined that the data rate changes to another data rate. For example, the method illustrated in FIG. 6 may be repeated utilizing the other data rate. For instance, the second video stream may be altered in accordance with the other data rate and the method illustrated in FIG. 6.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
   a processor;
   a network interface coupled to the processor and configured to be coupled to a network;

a sensor, coupled to the processor, that includes a projector and that is configured to track a person; and
a memory medium, coupled to the processor, that includes instructions executable by the processor;
wherein as the processor executes the instructions, the system:
  receives, via at least one camera, a first video stream that includes images of the person and audio;
  determines, via adaptive bitrate streaming, a data rate between the system and another system;
  determines that the data rate is within a data rate range of a plurality of data rate ranges;
  if the data rate range is a first data rate range of the plurality of data rate ranges:
    composites a static picture of a face of the person onto an avatar skeleton;
    provides, to the network, a second video stream that includes a first composition of the static picture of the face of the person composited onto the avatar skeleton, the audio, and an image of a chamber where the person is located;
    tracks the person via the sensor;
    updates the avatar skeleton based on tracking the person; and
    provides, to the network, the second video stream that includes the first composition of the static picture of the face of the person composited onto the avatar skeleton based on updating the avatar skeleton and the audio, without updating the image of the chamber; and
  if the data rate range is a second data rate range of the plurality of data rate ranges:
    composites video of the face of the person onto an avatar of the person;
    provides, to the network, the second video stream that includes a second composition of the video of the face of the person onto the avatar of the person, the audio, and the image of the chamber where the person is located;
    tracks the person via the sensor;
    updates the avatar based on tracking the person; and
    provides, to the network, the second video stream that includes the second composition of the video of the face of the person onto the avatar based on updating the avatar and the audio, without updating the image of the chamber.

2. The system of claim 1, wherein the system further:
if the data rate range is below the first data rate range, provides, to the network, the second video stream that includes a static picture of the person and the audio; and
if the data rate range is above the second data rate range, provides, to the network, the first video stream and the audio.

3. The system of claim 1,
wherein when the system composites the static picture of the face of the person onto the avatar skeleton, the system further composites the static picture of the face of the person and the avatar skeleton onto the image of the chamber; and
wherein when the system provides, to the network, the second video stream that includes the first composition of the static picture of the face of the person composited onto the avatar skeleton, the audio, and the image of the chamber where the person is located, the system provides, to the network, the second video stream that includes the first composition of the static picture of the face of the person composited onto the avatar skeleton composited onto the image of the chamber.

4. The system of claim 1, wherein the system further provides avatar skeletal data based on one or more movements of the person.

5. The system of claim 1, wherein the second video stream includes a scalable video coding video stream.

6. The system of claim 1, wherein the system further:
determines that the data rate has changed to another data rate;
determines that the other data rate is within another data rate range, different from the data rate range, of the plurality of data rate ranges;
if the other data rate range is the first data rate range of the plurality of data rate ranges:
  composites the static picture of the face of the person onto the avatar skeleton; and
  provides, to the network, the second video stream that includes the first composition of the static picture of the face of the person composited onto the avatar skeleton and the audio; and
if the other data rate range is the second data rate range of the plurality of data rate ranges:
  composites the video of the face of the person onto the avatar of the person; and
  provides, to the network, the second video stream that includes the second composition of the video of the face of the person onto the avatar of the person and the audio;
if the other data rate range is below the first data rate range, provides, to the network, the second video stream that includes the static picture of the person and the audio; and
if the other data rate range is not below the first data rate range, provides, to the network, the first video stream and the audio.

7. A method, comprising:
receiving, via at least one camera, a first video stream that includes images of a person and audio;
determining a data rate between the system and another system;
determining, via adaptive bitrate streaming, that the data rate is within a data rate range of a plurality of data rate ranges;
if the data rate range is a first data rate range of the plurality of data rate ranges:
  compositing a static picture of a face of the person onto an avatar skeleton;
  providing, to the network, a second video stream that includes a first composition of the static picture of the face of the person composited onto the avatar skeleton, the audio, and an image of a chamber where the person is located;
  tracking the person via a sensor that includes a projector;
  updating the avatar skeleton based on the tracking the person; and
  providing, to the network, the second video stream that includes the first composition of the static picture of the face of the person composited onto the avatar skeleton based on the updating the avatar skeleton and the audio, without updating the image of the chamber; and
if the data rate range is a second data rate range of the plurality of data rate ranges:
  compositing video of the face of the person onto an avatar of the person;

providing, to the network, the second video stream that includes a second composition of the video of the face of the person onto the avatar of the person, the audio, and the image of the chamber where the person is located;
tracking the person via the sensor that includes the projector;
updating the avatar based on the tracking the person; and
providing, to the network, the second video stream that includes the second composition of the video of the face of the person onto the avatar based on the updating the avatar and the audio, without updating the image of the chamber.

8. The method of claim 7, further comprising:
if the data rate range is below the first data rate range, providing, to the network, the second video stream that includes a static picture of the person and the audio; and
if the data rate range is above the second data rate range, providing, to the network, the first video stream and the audio.

9. The method of claim 7,
wherein the compositing the static picture of the face of the person onto an avatar skeleton includes compositing the static picture of the face of the person and the avatar skeleton onto the image of the chamber; and
wherein the providing, to the network, the second video stream that includes the first composition of the static picture of the face of the person composited onto the avatar skeleton, the audio, and the image of the chamber where the person is located includes providing, to the network, the second video stream that includes the first composition of the static picture of the face of the person and the avatar skeleton composited onto the image of the chamber.

10. The method of claim 7, further comprising:
providing avatar skeletal data based on one or more movements of the person.

11. The method of claim 7, wherein the second video stream includes a scalable video coding video stream.

12. The method of claim 7, further comprising:
determining that the data rate has changed to another data rate;
determining that the other data rate is within another data rate range, different from the data rate range, of the plurality of data rate ranges;
if the other data rate range is the first data rate range of the plurality of data rate ranges:
compositing the static picture of the face of the person onto the avatar skeleton; and
providing, to the network, the second video stream that includes the first composition of the static picture of the face of the person composited onto the avatar skeleton and the audio; and
if the other data rate range is the second data rate range of the plurality of data rate ranges:
compositing the video of the face of the person onto the avatar of the person; and
providing, to the network, the second video stream that includes the second composition of the video of the face of the person onto the avatar of the person and the audio;
if the other data rate range is below the first data rate range, providing, to the network, the second video stream that includes the static picture of the person and the audio; and
if the other data rate range is not below the first data rate range, providing, to the network, the first video stream and the audio.

13. A computer-readable non-transitory memory medium that includes instructions, that when executed by a processor of a system, the system:
receives, via at least one camera, a first video stream that includes images of a person and audio;
determines, via adaptive bitrate streaming, a data rate between the system and another system;
determines that the data rate is within a data rate range of a plurality of data rate ranges;
if the data rate range is a first data rate range of the plurality of data rate ranges:
composites a static picture of a face of the person onto an avatar skeleton; and
provides, to the network, a second video stream that includes a first composition of the static picture of the face of the person composited onto the avatar skeleton, the audio, and an image of a chamber where the person is located;
tracks the person via a sensor that includes a projector;
updates the avatar skeleton based on tracking the person; and
provides, to the network, the second video stream that includes the first composition of the static picture of the face of the person composited onto the avatar skeleton based on updating the avatar skeleton and the audio, without updating the image of the chamber; and
if the data rate range is a second data rate range of the plurality of data rate ranges:
composites video of the face of the person onto an avatar of the person;
provides, to the network, the second video stream that includes a second composition of the video of the face of the person onto the avatar of the person, the audio, and the image of the chamber where the person is located;
tracks the person via the sensor that includes the projector;
updates the avatar based on tracking the person; and
provides, to the network, the second video stream that includes the second composition of the video of the face of the person onto the avatar based on updating the avatar and the audio, without updating the image of the chamber.

14. The computer-readable non-transitory memory medium of claim 13,
wherein when the system composites the static picture of the face of the person onto the avatar skeleton, the system further composites the static picture of the face of the person and the avatar skeleton onto the image of the chamber; and
wherein when the system provides, to the network, the second video stream that includes the first composition of the static picture of the face of the person composited onto the avatar skeleton, the audio, and the image of the chamber where the person is located, the system provides, to the network, the second video stream that includes the first composition of the static picture of the face of the person composited onto the avatar skeleton composited onto the image of the chamber.

15. The computer-readable non-transitory memory medium of claim 13, wherein the system further provides avatar skeletal data based on one or more movements of the person.

16. The computer-readable non-transitory memory medium of claim 13, wherein the system further:
- determines that the data rate has changed to another data rate;
- determines that the other data rate is within another data rate range, different from the data rate range, of the plurality of data rate ranges;
- if the other data rate range is the first data rate range of the plurality of data rate ranges:
  - composites the static picture of the face of the person onto the avatar skeleton; and
  - provides, to the network, the second video stream that includes the first composition of the static picture of the face of the person composited onto the avatar skeleton and the audio; and
- if the other data rate range is the second data rate range of the plurality of data rate ranges:
  - composites the video of the face of the person onto the avatar of the person; and
  - provides, to the network, the second video stream that includes the second composition of the video of the face of the person onto the avatar of the person and the audio;
- if the other data rate range is below the first data rate range, provides, to the network, the second video stream that includes the static picture of the person and the audio; and
- if the other data rate range is not below the first data rate range, provides, to the network, the first video stream and the audio.

\* \* \* \* \*